C. G. BARTH & F. ÖYEN.
METHOD AND MEANS FOR MEASURING BELTS UNDER TENSION.
APPLICATION FILED MAR. 27, 1916.

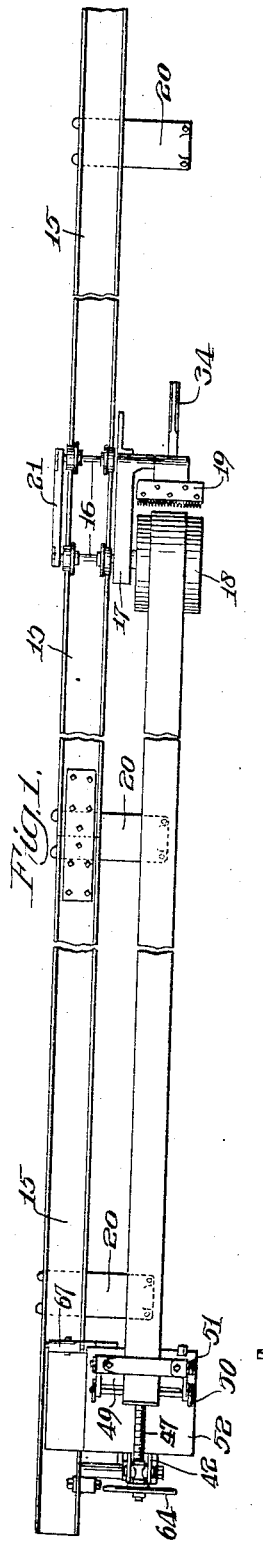
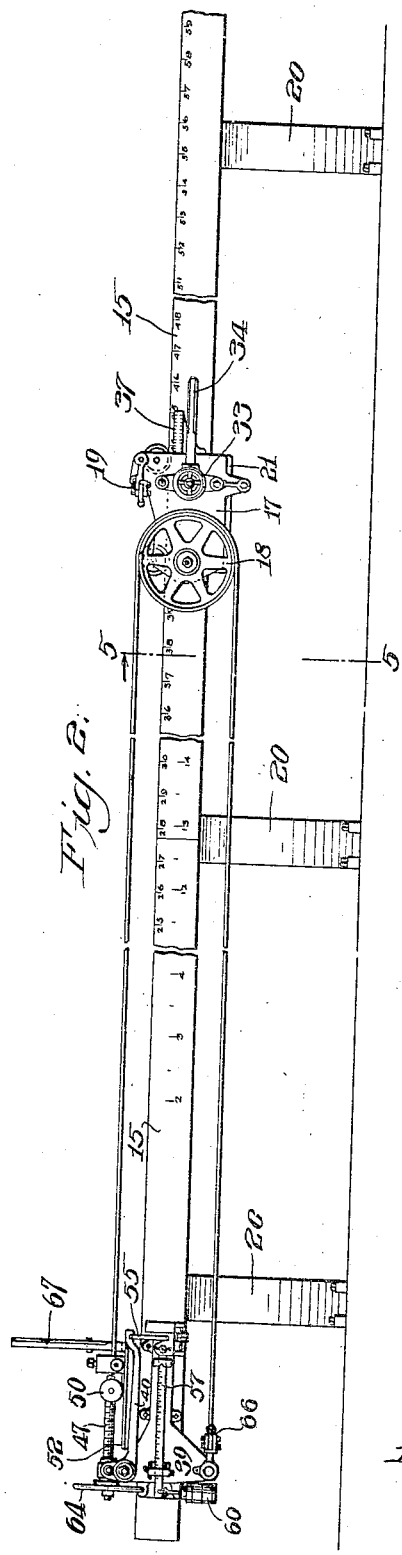
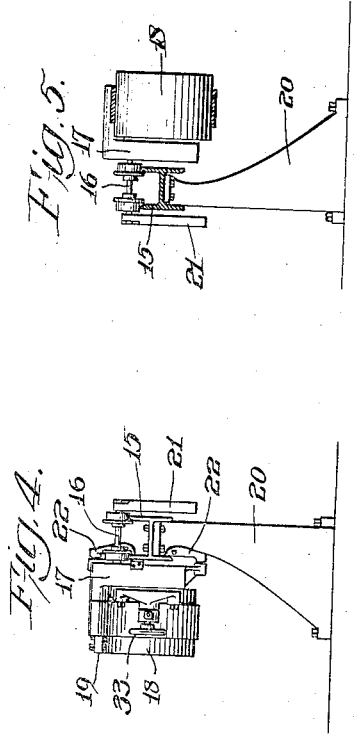
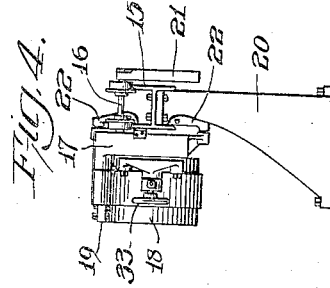
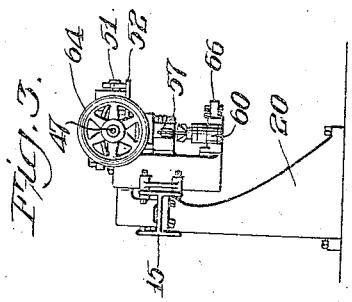

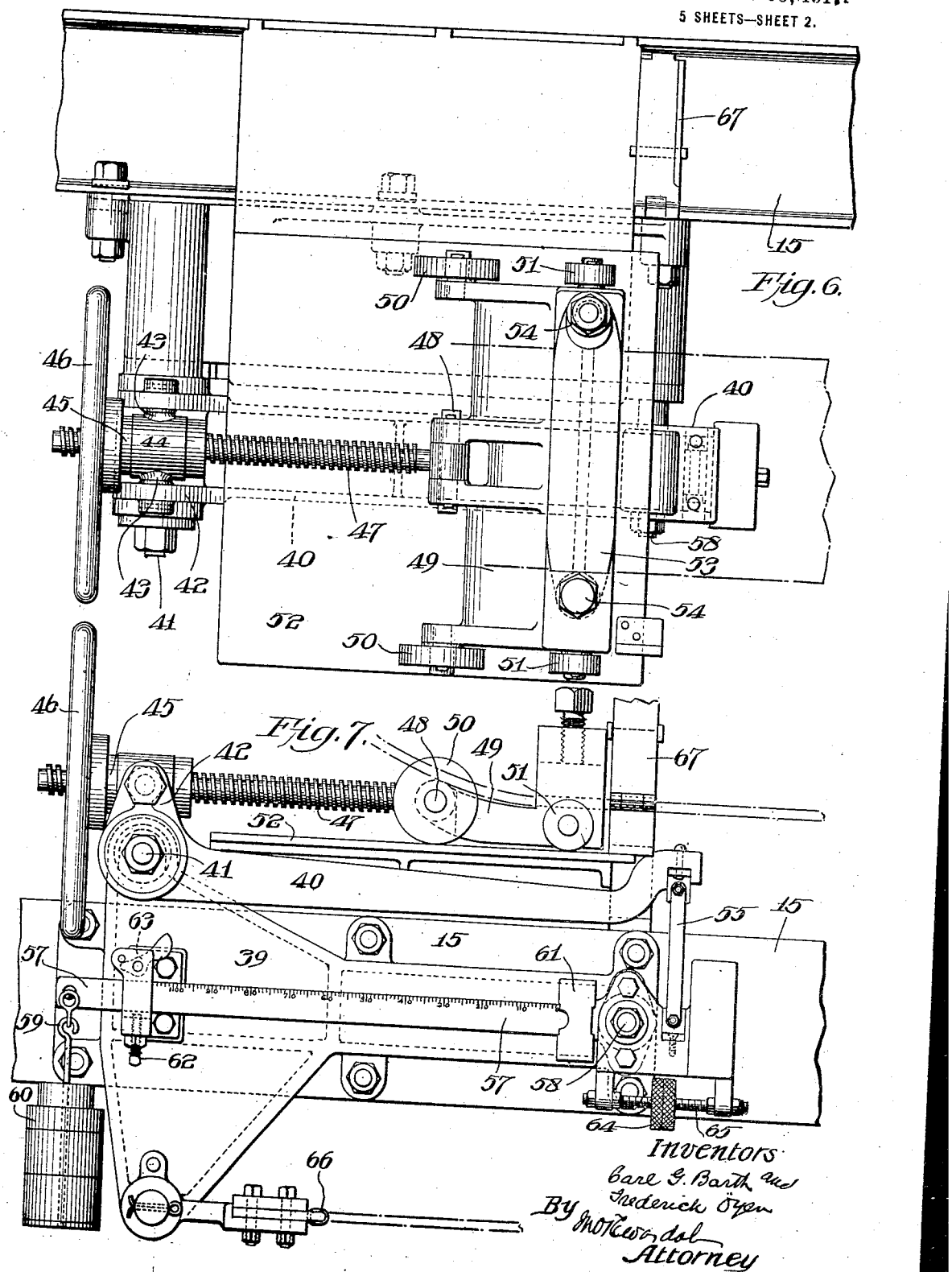

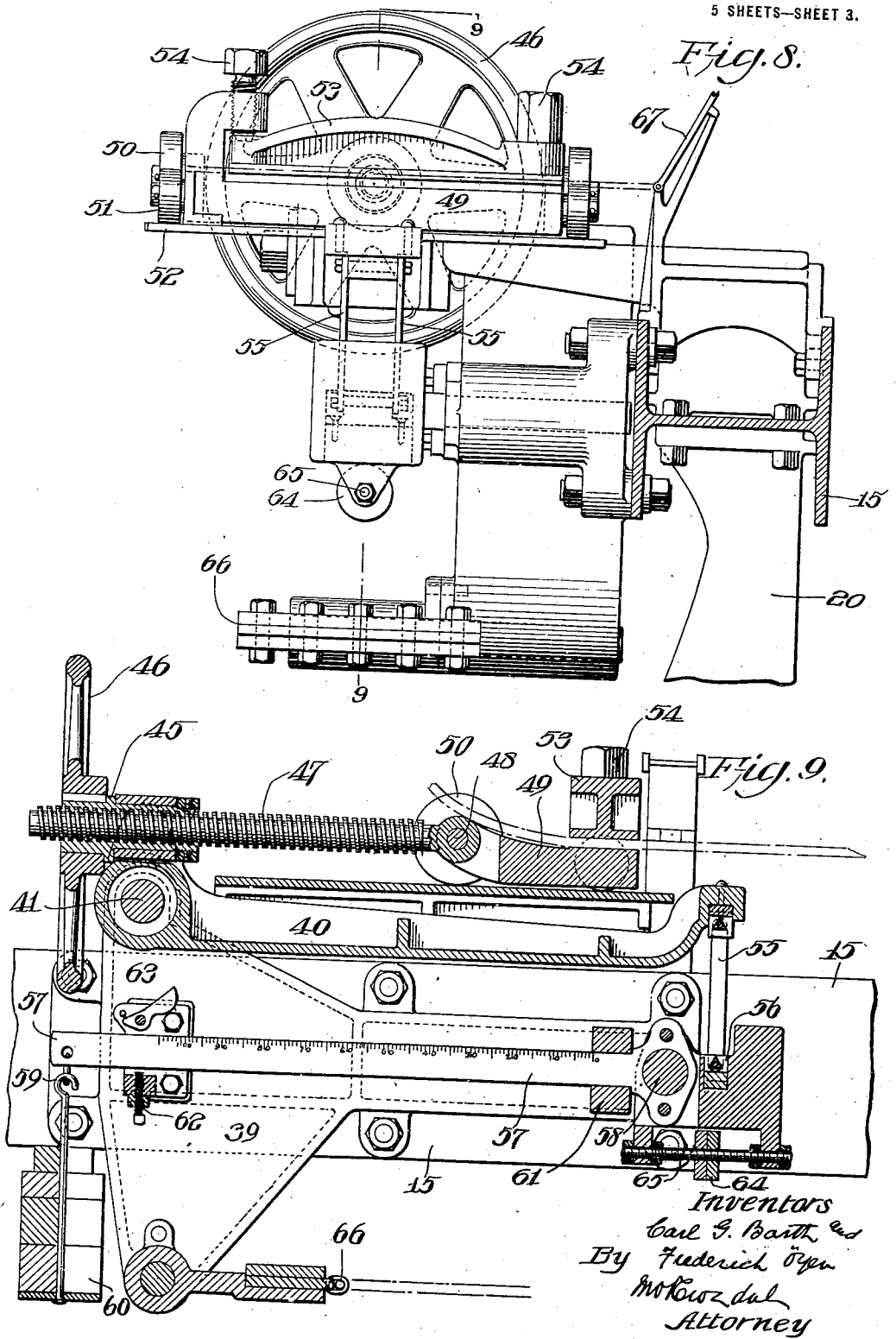

1,250,943.

Patented Dec. 25, 1917.
5 SHEETS—SHEET 4.

Inventors
Carl G. Barth
Frederick Öyen
By M. O. Kurzhal
Attorney

UNITED STATES PATENT OFFICE.

CARL G. BARTH, OF PHILADELPHIA, PENNSYLVANIA, AND FREDERICK ÖYEN, OF STABÄK, NORWAY.

METHOD AND MEANS FOR MEASURING BELTS UNDER TENSION.

1,250,943.  Specification of Letters Patent.  Patented Dec. 25, 1917.

Application filed March 27, 1916.  Serial No. 87,066.

*To all whom it may concern:*

Be it known that we, CARL G. BARTH and FREDERICK ÖYEN, citizens of the United States, residents, respectively, of Philadelphia, county of Philadelphia, State of Pennsylvania, and Stabäk, Norway, have invented a new and useful Method and Means for Measuring Belts Under Tension, of which the following is a specification.

Our invention relates to method and means for measuring belts under required tensions. The object is to secure and indicate the required length of a belt while the same is subjected to the tension at which it should work in transmitting power, having regard to its length, breadth and thickness.

This invention is an improvement on the belt fixers' bench originally developed by Mr. Gullow Gulowsen, in which spring balances were used for weighing the tension in the belt. The bench was provided with a pair of pulleys which could be so adjusted that a tape-line would measure the same around these pulleys as over the pulleys on which the belt was to run. Such adjustment having been made for a belt that it was desired to cut to length under a certain tension, this belt was laid over these pulleys and its free ends firmly clamped in a pair of specially constructed belt tightening clamps provided with spring balances that would register the tension subsequently produced in the belt by means provided for drawing the clamps together, these consisting essentially of two non-revolving screws, a nut on each of these provided with skewed gear teeth into which were engaged the teeth of two other skew gears mounted on a common crank shaft that spanned the clamps in a manner not to interfere with the belt. Such a bench, with this indirect way of securing the desired tension in a belt, was built in accordance with the Gulowsen designs, by the Bethlehem Steel Company in the year 1900, and was described and illustrated in paper No. 1230, entitled "The transmission of power by leather belting," by Carl G. Barth, one of the present applicants, and presented at the New York monthly meeting (January 1909) of the American Society of Mechanical Engineers, see Fig. 6, page 47, and paragraphs 67 and 68, page 48, of said paper. The Gulowsen belt bench was a great improvement over the more direct but exceedingly unhandy method of tightening, cutting to length, and lacing a belt to a certain tension in position over its own pulleys, by means of similar though not identical belt clamps provided with spring balances, as practised for years previously by the late Frederick W. Taylor; but was still, in many respects, a rather crude device. Thus, it was difficult to obtain and maintain reliable spring balances, and, there being two of them, half the required tension had to be read on the scale of each, which was somewhat confusing; several inches of the free ends of the belt inside the clamps did not partake in the tension produced and the one pulley or drum on the bench was not arranged to revolve, but was purposely fixed so that it might be made hollow to serve as a receptacle for a roll of belting whenever a new belt had to be cut from such a roll.

The main purpose of the present invention has been to overcome these imperfections in the Gulowsen belt bench, which, so far as applicants are aware, was never patented, and thus obtain a much more accurate belt measuring device.

Referring to the drawings, which illustrate merely by way of example, suitable embodiment of our invention:—

Figure 1 is a plan view of apparatus for effecting our invention.

Fig. 2 is a side elevation of same.

Fig. 3 is a rear end elevation.

Fig. 4 is a front end elevation.

Fig. 5 is a section on line 5, 5 of Fig. 2.

Fig. 6 is a plan view on an enlarged scale of the fixed head and the tension measuring device.

Fig. 7 is a side elevation of same.

Fig. 8 is an end elevation of same.

Fig. 9 is a section on line 9, 9 of Fig. 8.

Figure 10:
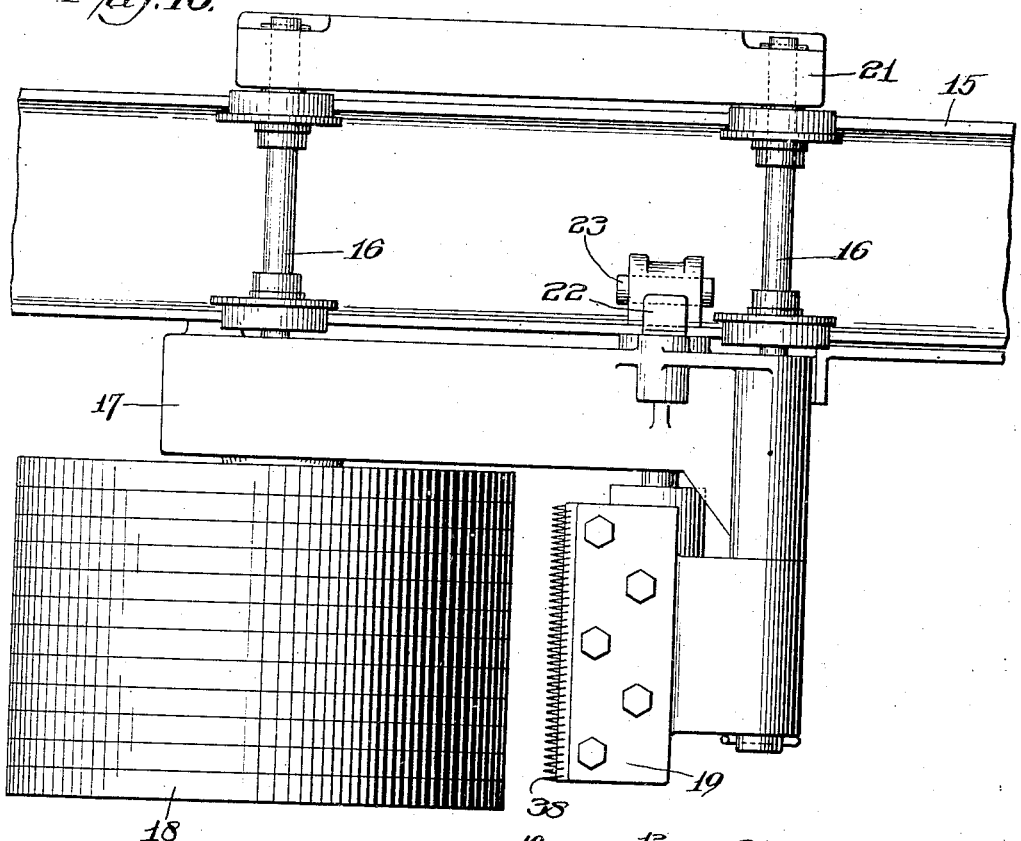
Fig. 10 is a plan view of the movable head.

Figs. 6 to 13 inclusive are on the same scale.

Similar numerals refer to similar parts throughout the several views.

The measuring bar 15 is shown channeled in the form of an H, one pair of parallel flanges forming tracks for the wheels of the carriage 16, which supports the movable head 17, which carries the pulley 18 and the clamp 19. The bar 15 is supported on the posts 20 bolted to suitable foundations. The carriage 16 is provided with a weight 21 on the opposite side thereof from the movable head 17 in order to counterbalance the same.

Figure 13:
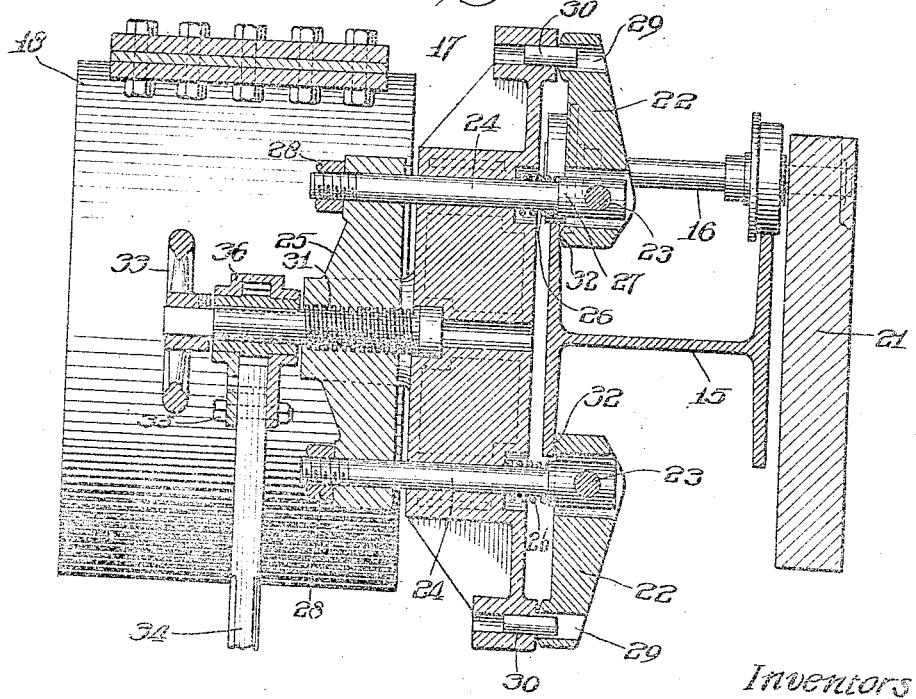
Fig. 13 is a section on line 13, 13 of Fig. 11.

The head 17 is provided with means for clamping the same to the bar 15 in any desired position of adjustment. Referring to Fig. 13, the clamping dogs 22 are secured by pins 23 to the rods 24 which are slidably mounted in the head 17. The opposite ends of rods 24 project through the crosshead 25. The springs 26 are seated between head 17 and the enlargements 27 of said rods 24. The nuts 28 serve to limit the spring actuated movement of said rods 24. The dogs 22 are provided at their outer ends with recesses 29 for receiving the pins 30, which are secured in the head 17. The recesses 29 are shown considerably larger than the pins 30 to permit of play. These dogs 22 are provided at their inner ends with the noses 32. The screw 31 is threaded in the cross-head 25, and has one end fitting in a recess in the head 17 and is provided at its outer end with a hand wheel 33. By turning the screw 31 in one direction the rods 24 are drawn to the left causing the noses 32 to be clamped against the flanges of bar 15, thereby locking the head 17 in its position of adjustment. The hand wheel 33 is adapted to bring the said dogs into said preliminary locking position, but in order to give a sufficient grip to prevent any possibility of displacement, after the head 17 has been brought to its proper position of adjustment, the lever 34 is employed to increase the efficiency of this clamping action of the dogs 22; the operation being to secure further rotative movement of screw 31, by means of this lever, which is secured by the bolt 35 passing through a slot in the lever 34. The lever is pushed into one of a number of recesses in the hub 36, secured to screw 31.

For the purposes of securing the proper position of adjustment of the carriage, scale graduations are provided on the measuring bar 15, one set of scale graduations are adapted for long belts measuring, say between twenty-five and sixty feet; while the other scale of graduations are for shorter belts, say from two to fourteen feet. The upper graduations being for the longer belts.

Figure 11:
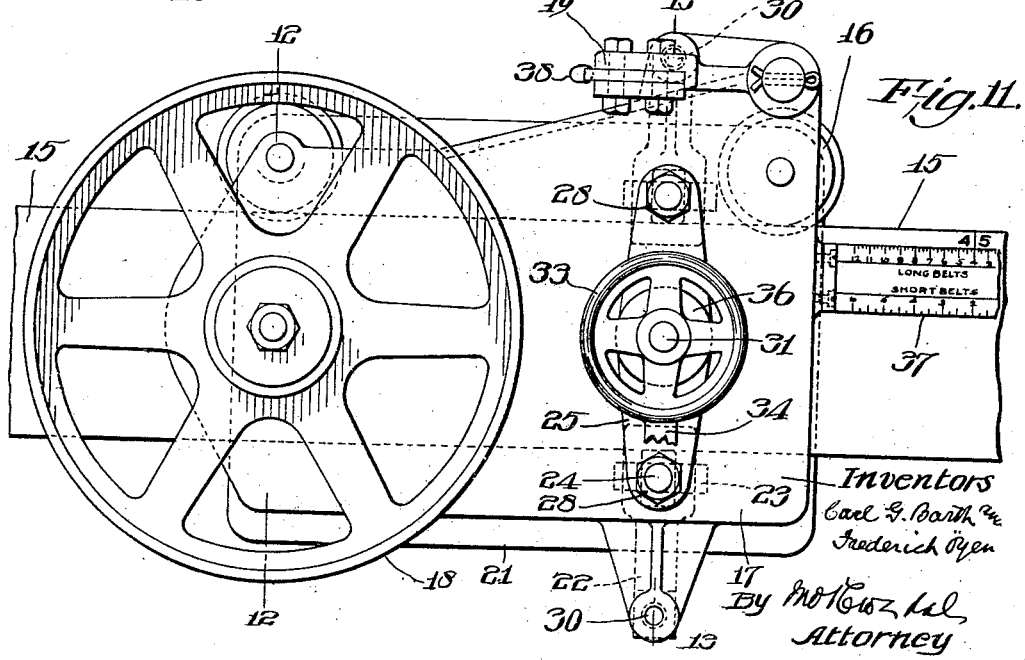
Fig. 11 is a side elevation of same.
Figure 12:
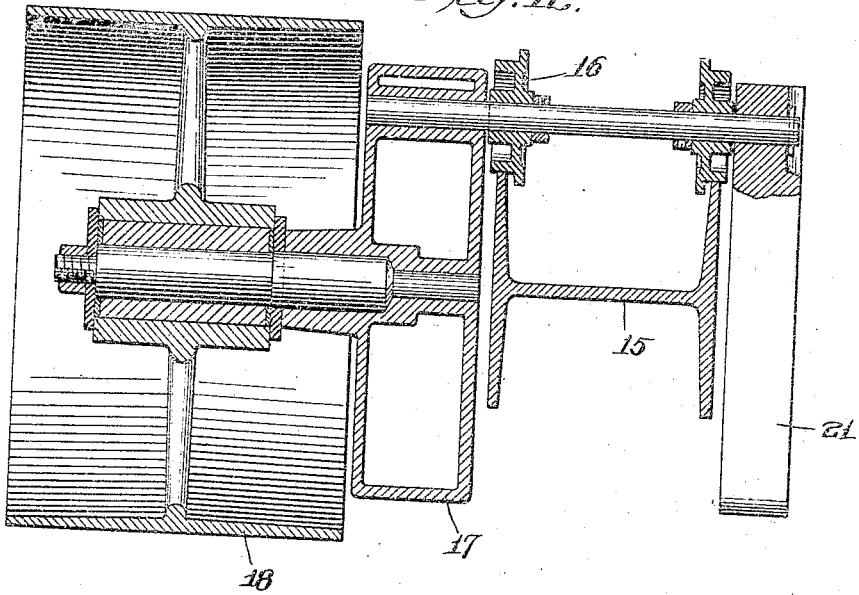
Fig. 12 is a section on line 12, 12 of Fig. 11.

The long belts are such belts as are measured around the pulley 18, the shorter belts are such as are measured between the stationary head, and the clamp 19, on the movable head, which will be described hereafter. Secured to the head 17 is a shorter graduated scale 37, having an upper scale for coöperating with the long belt scale, and a lower scale for coöperating with the short belt scale. For example, if it is desired to measure and cut a belt, under the proper tension, measuring forty-five feet, four inches, the movable head 17 is brought to a position where the figure 4, on the upper short scale, will register with the figures 45 on the upper fixed scale, as shown in Fig. 11, whereupon the head being clamped into such position, in the manner as hereinbefore described, this part is ready for the operation of stretching and measuring.

Where a short belt is to be measured, the clamp 19 is used, instead of the pulley 18. For example, one end of the belt is provided with the usual lacing, which is brought into coöperation with the lacing 38 on said clamp 19, and secured by the usual pin. The adjustment of the movable head is then made by using the lower movable scale coöperating with the lower fixed scale, in the same way as described in connection with the long belt, that is, if a belt 14 feet, 2 inches was required the figure 2, of the movable scale would be brought into register with the figure 14 of the lower fixed scale.

In order that the belt to be measured shall be subjected to the required tension while being measured, we have provided the following mechanism:

The fixed head 39 is bolted to the measuring bar 15 and carries the member 40, which is pivoted at 41 to said fixed head. This member 40 carries the bifurcated arms 42, in which are secured the trunnions 43 of the sleeve 44. Within sleeve 44 is swiveled the threaded sleeve 45 carrying the hand wheel 46. Within this threaded sleeve 45 projects the screw 47, connected at its right hand end by pivot 48 to the carriage 49. Carriage 49 is provided with the wheels 50 and 51 which are supported by the table 52, carried by and forming part of the fixed head.

The carriage 49 carries the clamping mechanism, which comprises the bar 53 and the bolts 54. The belt is adapted to be inserted between the bar 53 and the part of carriage 49 coöperating therewith, whereupon the same is firmly clamped between said elements. The member 40 forms part of a weighing device, operating in a manner somewhat similar to that of the platform scales. This member 40 is adapted at its outer end to press upon the link 55, which communicates pressure to the outer end at 56, of the lever member 57, which is pivotally supported or has its fulcrum at 58. The other end of 57 is provided with the link and hook member 59 for supporting the weights 60. The member 57 is also provided with a graduated scale for the final adjustment of the weight 61. The setscrew 62 is provided for limiting the swing of member 57, and the pawl 63 is provided for locking the member 57 against movement in the usual way. The weights 64 on the threaded rod 65 are provided for the initial adjustment of the scale.

At the lower part of the fixed head 39 is provided the clamping device 66 similar in construction to the clamp 19, which is utilized when the long belts are measured, which have to pass from clamp 53 around pulley 18 to clamp 66.

67 is a scribing bar adapted to be thrown out of position, as shown in Fig. 8, part being broken away, until the belt has been properly stretched and measured, whereupon it is thrown into position across the belt forming a guide for scribing the same.

In operation, measuring for example a long belt, the movable head is brought to proper position of adjustment in the manner as above described, the free end of the belt is secured to the lacing held by the clamp 66, and carried around the pulley 18 to the clamp 53, or, if the belt is being measured from a roll of belting, the free end of the belt is passed beneath the clamping member 53 around the pulley 18 and secured to the lacing held by clamp 66, as indicated by the broken lines in Fig. 7. Clamping member 53 is then brought into effective clamping engagement with the belt. The length of the belt required will be that from the scribing device 67, which is fixed to the stationary head, to the end of the belt secured to the lacing held by clamp 66. After the belt has been brought under the required tension, which is ascertained by considering said length, width and thickness of the belt, by regular approved formula, this tension is represented by the position of the weight 61 on the graduated bar 57 of the scale or weighing mechanism, in combination with the weights 60. This weight 61 having been brought into the desired position to indicate the weight or tension desired to be exerted on the belt, the hand wheel 46 and screw 47 are rotated in the proper direction to cause the movement of the carriage 49 away from the movable head, which serves to tighten the belt held by the clamp 53, and, as the tension of the belt increases, such tension reacts on the elements of the scale until the weights 60 and 61 are counterbalanced, which indicates that the belt has been brought to the required tension. The scribing device 67 is then brought into proper position across the belt and the belt scored preparatory to severing, whereupon, after the tension has been reduced, the belt is severed on the line so marked.

It will thus be seen that the entire length of the belt to be cut, to the lacing at 38 or 66, as the case may be, is placed under the indicated tension, and moreover without any intervening disturbing factors, such as friction, before the belt is finally measured and scribed, and there is a free pull from the lacing holding one end of the belt to the point for example, where the sliding weight 61 indicates the tension required.

It will also be noted that with the gravity scales herein described the weights are first set for the predetermined tension, while in the earlier construction referred to the belt was stretched until the spring balances indicated the desired tension.

What we claim is:—

1. The method of measuring belts which consists in stretching the belt under a predetermined tension throughout the entire length to be measured, one end of the belt being fixed and the other end secured to a movable clamp beyond a marking point at a measured distance from the fixed end, and applying a mark to the belt under tension opposite said marking point.

2. A measuring device, for stretching belts under a predetermined tension throughout the entire length to be measured, comprising means for securing one extreme end of the belt at a fixed point, a marking device at a measured distance from the fixed end, a movable clamp for securing the belt at a point distant from the fixed end greater than that of the marking device, means for moving said clamp to stretch the belt and a tension indicating device connected with the clamp.

3. The combination of means for securing one end of a belt to a fixed point at a required distance from a scribing device, means for clamping the belt at a point beyond said scribing device from said end, means for adjusting the clamp to bring the belt under required tension, means, controlled by the entire length of belt from its extreme end to the clamp, for indicating said required tension, and means for scribing or marking the belt at a fixed point a predetermined distance from said end.

4. The combination of means for securing the lacing on the end of the belt at a fixed point, a clamp for securing the belt at a distance from said end slightly greater than the predetermined length required so that the entire tension of the belt shall be exerted on the clamp, an antifriction support for the clamp, means for moving the clamp to bring the belt under tension and a gravity actuated balance connected with the clamping mechanism for indicating the whole tension of the belt between its end and the clamp, and a scribing device located at a required distance from said end for marking the belt when under the required tension.

5. The combination of belt clamping mechanism having an antifriction support, a balancing scale connected therewith, an adjusting device operating between the clamp and the scale mechanism, means for scribing or marking the belt, having a fixed position approximate the clamping means, and an adjustable head with graduated scales for measuring the length of the belt between its end and the scribing means.

6. The combination of belt clamping mechanism having an antifriction support, a balancing scale connected therewith, an adjusting device operating between the clamp and the scale mechanism, means for scribing or marking the belt, having a fixed position approximate the clamping means, and an adjustable head provided with a rotatable pulley for engaging the belt between its end and the part clamped for securing the required length of said belt between said end and the scribing device.

CARL G. BARTH.
FREDERICK ÖYEN.

Witnesses:
MAE HOFMANN,
THURE GRËWALD.

Copies of this patent may be obtained for five cents each, by addressing the "Commissioner of Patents, Washington, D. C."